G. T. PARR.
FISH HOOK.
APPLICATION FILED SEPT. 24, 1915. RENEWED MAR. 30, 1917.
1,246,150.  
Patented Nov. 13, 1917.
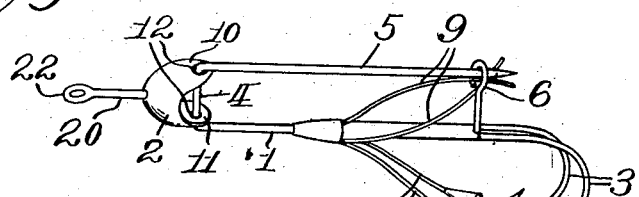
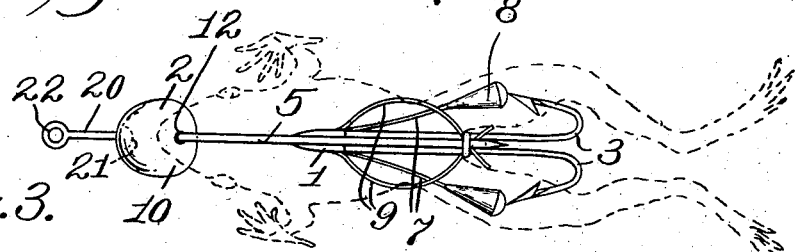
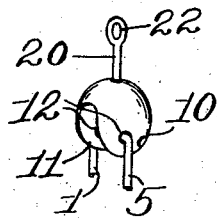
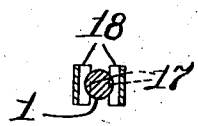
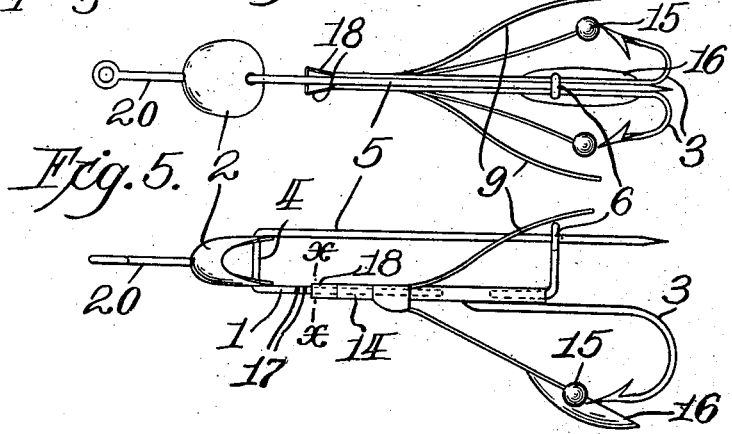
Inventor:
George T. Parr.

UNITED STATES PATENT OFFICE.

GEORGE T. PARR, OF ST. PAUL, MINNESOTA.

FISH-HOOK.

1,246,150. Specification of Letters Patent. Patented Nov. 13, 1917.

Application filed September 24, 1915, Serial No. 52,507. Renewed March 30, 1917. Serial No. 158,730.

*To all whom it may concern:*

Be it known that I, GEORGE T. PARR, a citizen of the United States, residing at St. Paul, in the county of Ramsey and State of Minnesota, have invented new and useful Improvements in Fish-Hooks, of which the following is a specification.

This invention relates to fishhooks of the character designed for use in connection with live bait, and particularly for employment in the use of frogs as bait in bass fishing, the primary object of the invention being to provide a hook whereby the frog will be held independently of the hook proper and disposed in a natural and life-like position in the water, whereby its efficiency as a lure will be increased.

A further object of the invention is to provide a hook having a safety fastening for holding the bait, and guards for preventing the hook from being entangled in weeds or other refuse matter, the fastening and guards are so arranged with relation to each other and to the hook as to secure the foregoing and other advantages hereinafter stated.

A still further object of the invention is to provide means for preventing water being forced in the mouth of the frog which is held as bait, thereby keeping the same in a more life-like and natural condition and prolonging the life of the bait.

The invention consists of the features of construction combination and arrangement of parts herein fully described and claimed, as illustrated in the accompanying drawing which forms part of the specification.

Figure 1 is a perspective of a fish hook embodied in my invention.

Fig. 2 is a top or plan view of the same, illustrating a frog secured thereto in the dotted outline.

Fig. 3 is a perspective of the swiveled line connector and hood, which is pivoted to the shank of the hook.

Fig. 4 is a plan view showing an alternative form of the invention.

Fig. 5 is a side elevation of the same.

Fig. 6 is a cross section of Fig. 5 taken on the line. $x-x$.

The device comprises an elongated stem or shank 1, having, at one end, a detachably pivoted shield 2, and at its other end one or more hooks 3, a gang hook consisting of a pair of hook members being shown in the present instance.

The shank or body portion 1 is bent at right angles to form a vertical portion 4, at its forward end, and a bait receiving pin 5 extends backward at right angles from the portion 4 and being adapted to lie practically parallel to the shank 1, when the pointed end of the pin 5 is engaged in the keeper 6. The keeper 6 is positioned at the rear of the shank 1, projecting upwardly just above the hooks 3.

Attached to the shank or body portion 1, at a point in advance of the hooks 3, are spring guard wires 7, which extend rearwardly toward the points of the hooks and are formed with an enlarged end of weight 8, which serves to balance the hooks 3 and hold the bait or frog right side up in the water. The ends 8 being adjacent to the points of the hook 3 keeps the same free from weeds while being drawn through the water, but when a strike is received from a bass or other game fish, the guard wires together with the end 8 will yield inwardly and permit the fish to take the hooks, which enter his mouth, and thereby hold the fish securely.

Secured at the same point on the shank stem 1, as the guard wires 7, and projecting upward and rearwardly, are spring guard wires 9, the free ends of which are adapted to be engaged in the keeper 6, as illustrated in Figs. 1 and 2.

The spring wires 9 serve to hold the bait or rear portion of the frog in central position between the shank 1 and the pin 5.

The shield 2 is composed of a shell-like hood having projecting spring lips 10 and 11, which have holes 12, through which the pin 5 is adapted to be passed and which pivotally connect the shield with the portion 4. The spring lips 10 and 11 tend to expand and when the pin 5 is passed through the holes 12 and the shield slipped onto the pin, the lips 10 and 11 should be compressed to allow the shield to slip over the right angular portion between the pin 5 and the portion 4. Thus, when the detachable shield is brought into place on the portion 4, the lips 10 and 11 will expand against the shank or body portion 1 and the pin 5, and lock the shield in place on the portion 4, to prevent casual displacement whereby the frog is held in a life-like position. A stem 20 is swivelly connected to the hood 2, and held by the head 21, which is formed on one end of the stem, and an eye 22 formed on the other end of the stem 20 serves as a line connecting means. Thus the hood and stem form a pivoted and swivel connection between the hook and the line when the line is connected in the eye 22.

In use the shield is released by compressing the lips 10 and 11 and slipping off the pin 5 after the pin 5 and wires 9 have been released from the keeper 6. The lips 10 and 11 are then placed over the mouth of a frog or the bait and the pin 5 inserted through the holes 12, passing through the lips of the frog or bait.

The shield with the frog is then slipped into position on the portion 4 and the free ends of the wires 9 and pin 5 secured in the keeper 6. The wire 9 encircles the rear quarter of the frog to hold him in position with his belly against the shank 1, and the pin 5 over his back. It is obvious that the frog will be held naturally in the water and practically protected against the bite of a fish. Thus allowing the same frog to be used repeatedly in catching a fish.

In the alternative form of my invention shown in Figs. 4 to 6, inclusive, the shank or body portion 1 of the fastening pin 5, which is connected at its forward end with said pin by a cross piece or vertical portion 4, is fitted to slide within a guide member 14, to which are fixed the hooks 3 and the keeper member 6.

To this guide member, which constitutes a body, are also fixed spring guard wires 9 and the weed guard wires 7, which keep the hooks free from weeds when the same is drawn through the water. The guard wires 7 have spherical heads 15 which are similar to the weighted ends 8 in Figs. 1 and 2, which assist in balancing the hook right side up. Centrally disposed between the guard wires 7 is a wire carrying a weight 16 on its free end, which serves to balance the frog or bait and hold the same right side up, and also acting as a rudder for the hooks.

The shank 1 is adjustable in the guide 14 to permit extension of the pin to any suitable degree, or the use of a pin of any suitable length, to suit the length of the frog or other bait to be used, and said shank is provided with notches 17 which are engaged by spring gripping jaws 18 at the forward end of the guide, by means of which the pin is locked in adjusted position against casual displacement, but can be released and adjusted by releasing pin 5 from keeper 6 and turning the shank 1 and pin 5 a quarter turn in the guide member 14, thereby releasing the locking jaws 18 from the notches 17 and causing the locking jaws to rest on the circumference of the shank 1, allowing the shank 1 to be slid back or forth freely to give the desired length, whereupon the shank 1 is turned back to former position and the jaws will engage the notches and hold the same. Thus by the described mode of attaching the bait to the device, injury to the bait will be avoided and it will accordingly live a long time, and it will be seen that the guard wires 7, in addition to serving the function set forth, will also guard and protect the legs of the bait, thus compelling the fish to swallow the bait together with the hooks. The hood or shield 2 having lips 10 and 11 which engage the lips of the frog to hold the mouth of the frog closed when the frog is dragged through the water, as in trolling or drawing in the line. As a result, the forcible opening of the mouth and filling of the body of the frog with water will be prevented, thereby further prolonging the life of the bait.

I claim:—

1. A fishing device comprising a shank and fastening pin, united by a vertical portion at the forward end of the body, a keeper at the rear end of the shank for inter-locking engagements with said pin, hooks carried by the shank, and a line connector having spaced lips engaging said vertical portion of the body.

2. A fishing device comprising a shank and fastening pin connected at the forward end of the shank by a vertical portion, a keeper at the rear end of the shank to receive and interlock with said pin, hooks at the rear end of the body projecting at the side of the shank opposite to the keeper, spring guards projecting from said shank toward the keeper and free end of the fastening pin, spring guards projecting from the shank toward the ends of the hooks, and a hood swivelly connected to a line connector, said hood having spaced lips pivotally engaging the vertical portion of said shank.

3. A fishing device including a body forming a guideway, spring grippers thereon, a keeper carried by the body, hooks carried by the body, a pin adapted for engagement with said keeper, a shank slidably engaging the guideway in the body and having notches to receive the grippers, said shank being connected with the pin by a vertical portion at the forward end of the device, and a hood having spaced lips apertured for pivotal and slidable engagement with said vertical portion.

4. A fishing device having a hook and shank, and provided with means for securing a frog thereto, said means including a line connector swivelly connected to a hood, said hood having lips for holding the mouth of the frog closed.

5. A fishing device having a hook and shank, and provided with means for securing a frog thereto, said frog holding means including a detachable hood pivotally connected to a vertical portion of said shank at the forward end of the same, and a line connector swivelly connected to said hood adapted to connect with a fishing line.

6. A fishing device comprising a shank and fastening pin connected at the forward end of the shank by a vertical portion, a keeper at the rear end of the shank to receive and interlock with said pin, hooks at the rear end of the body projecting at the side of the shank opposite to the keeper, a hood detachably and pivotally connected to said vertical portion, said hood being adapted to fit over the lips of a frog and said vertical portion being adapted to pass through the lips of said frog to hold the frog in position between said shank and pin.

In testimony whereof I affix my signature in presence of two witnesses.

GEORGE T. PARR.

Witnesses:
JAMES A. MARTIN,
VIVIAN RICH.

Copies of this patent may be obtained for five cents each, by addressing the "Commissioner of Patents, Washington, D. C."